3,063,849
METHOD OF PRODUCING DEHYDRATED
COOKED POTATOES
Alvin I. Nelson, Champaign, John N. McGill, Urbana, and Marvin P. Steinberg, Champaign, Ill., assignors to International Minerals & Chemical Corporation, a corporation of New York
No Drawing. Filed Oct. 17, 1960, Ser. No. 62,902
10 Claims. (Cl. 99—207)

This invention relates to dehydrated cooked potatoes and, more particularly, to dehydrated cooked potatoes which may be reconstituted either to provide a mashed or a baked potato product.

Dehydrated cooked potatoes which may be reconstituted by mechanically mixing with water or milk have appeared commercially in either a flake or a granular form. Such prior art processes are typified, inter alia, by United States Patents 2,469,995, 2,470,374, 2,481,122, 2,564,296, 2,759,832, 2,780,552, and 2,787,553. While these products are characterized by acceptable color and for some purposes acceptable texture and flavor, they are not suitable to provide baked potatoes upon reconstitution. Moreover, prior art products tend to provide inferior potato soups. Precooked potatoes produced by the granule process yield a soup which is gravy-like. Other dehydrated forms produce soups of objectionable or inferior appearance and texture.

It is a primary object of this invention to provide a dehydrated cooked potato product which may be reconstituted either to provide mashed potatoes or a baked potato.

It is a further object of this invention to provide a dehydrated cooked potato product which may be reconstituted without mechanical admixing of the product with water to provide a baked potato.

It is another object of this invention to provide a dehydrated cooked potato product which upon reconstitution maintains a high color integrity.

It is yet another object of this invention to provide a dehydrated cooked potato product which upon reconstitution exhibits excellent flavor characteristics.

It is still another object of this invention to provide a dehydrated cooked potato product which upon reconstitution demonstrates a superior texture.

In accordance with this invention, dehydrated cooked potatoes are produced by the process which comprises:

(1) Precooking potato slabs at a temperature of about 145° F. to about 170° F. for a time period of from about 15 to about 45 minutes in water containing calcium ions as the sole essential mineral ingredient;
(2) Cooling the precooked potato slabs to a temperature below about 60° F. with cold water essentially free of minerals other than calcium and maintaining the potato slabs at a temperature below about 60° F. for at least about 10 minutes;
(3) Cooking the cooled precooked potato slabs with steam for a time period of from about 10 to about 20 minutes;
(4) Mashing the hot cooked potatoes;
(5) Rapidly drying the mashed potatoes as a thin film on a heated surface to a moisture content of not more than about 5%; and
(6) Crumbling the dried potato to provide a potato crumb not greater than about 1/8" in cross-section, said process being carried out in the substantial absence of iron contamination.

The dehydrated cooked potato material of this invention is in the form of crumbs which may be mechanically admixed with hot water or milk to provide a mashed potato product, or which may be reconstituted to provide a product having the flavor and texture of a baked potato simply by adding milk and heating for a short period of time. Further, the dehydrated potato product of this invention may be employed to provide a potato soup which contains potato particles of suitable size to give a combination of desirable texture and taste.

This invention embraces potatoes generically. While Idaho russet potatoes are preferred, the invention also may be employed utilizing other potato varieties of good quality. It will be appreciated that optimum process conditions may vary slightly, depending upon the type of potato being processed.

Prior to cooking, the potatoes are subjected to standard preliminary preparation such as washing, peeling and slicing. Washing may be accomplished in any standard manner and the potato thereafter may be peeled, washed and trimmed, again employing any of the standard procedures known to the art. For example, the potato may be subjected to abrasion, lye or steam to remove the peel. While it is desirable that the potato be sliced, the precise manner of slicing the potato is not critical. Generally it is preferred that the slices have at least one dimension of less than about 3/4 of an inch.

In accordance with the process of this invention, the sliced potatoes are precooked with water containing calcium ions as the sole essential mineral ingredient at a temperature of from about 145 to about 170° F. for a period of about 15 to about 45 minutes, and preferably at a temperature of from about 160° F. to about 170° F. for a period of from about 25 to about 35 minutes. Optimum results appear to be achieved when the sliced potato is precooked at about 165° F. for about 30 minutes. The amount of water employed in the precooking step may be varied as desired. Water in amounts about equal to the weight of the potatoes advantageously is employed.

Following the precooking step, the potatoes are cooled to a temperature below about 60° F. and may be cooled to as low as about 30° F. with equally favorable effects. The cooling is thought to effect a modification of amylose which is not fully changed thereafter by heating. The time for which the potato is held at a reduced temperature does not appear to be critical. The potato can be held at a low temperature, for example, from about 10 minutes to one and a half hours or more. Longer cooling times appear to improve texture slightly and, accordingly, cooling times from about 20 minutes to about one hour are considered optimum. The cooling advantageously can be accomplished utilizing cold, substantially mineral-free water. Alternatively, water containing calcium ions as the sole essential mineral ingredient may be utilized. Ice made from such water also may be employed as an equivalent of cold water.

The cooled potatoes next are cooked with steam for about 10 to about 20 minutes and preferably for about 16 minutes. While steam at atmospheric pressure having a temperature of about 210° F. may be employed to accomplish the cooking, it will be apparent that steam at pressures above atmospheric also may be employed, although no significant advantages are realized by utilizing the higher pressure steam. As indicated earlier, the optimum cooking time may vary slightly, depending upon the potato employed.

The hot cooked potatoes are then mashed. The particular method employed for mashing is not critical and any known method may be employed so long as the mashing is accomplished while the potato is hot.

The hot mashed potatoes are dehydrated rapidly as a thin film on a heated surface to provide a dry, low density flake. The dehydration is accomplished in less than about one minute. The drying operation most appropriately may be accomplished employing a stainless steel double or single drum dryer with about 60 p.s.i.g. steam pressure in the drums. The roll spacing should be about 0.01 inch adjusted with the rolls hot. Most desirably the roll speed should be adjusted to provide a potato film having a moisture content of not more than about 5%.

Addition of demineralized water or water containing calcium ions as the sole essential mineral ingredient to the mash has been found to aid in the drying of the flakes. Generally the water addition will be from about 10 to about 20% by weight of the mash, but will vary, depending upon the potato being processed and the precise drying operations employed.

Finally, the dried potato film is crumbled to yield a finished product. The potato crumb product is characterized by a wide range of sizes from individual cells to particles which will just pass a standard 1/8 inch wire screen. Crumbling most desirably may be effected utilizing a 1/8 inch stainless steel wire screen. The crumbled product is characterized by a density of about 0.3 gram per cc., though this may vary.

In the event that the crumbled product exhibits a moisture content greater than desired, the product may be subjected to additional drying to reduce the moisture content.

The utilization of demineralized water in the process insures a product having superior flavor. Iron apparently reacts with tannin or phenol products to produce complexes which tend to darken the product and impart a bitter taste thereto. In order to avoid this undesirable effect, the water employed throughout the process, including the final rinsing of the sliced raw potato, the precooking, the intermediate cooling and the final drying should be substantially free of iron. Demineralized water most appropriately may be employed, but the demineralized water for the precook should contain added calcium ions to maintain the desired body in the final product. The use of totally demineralized water in the precook tends to provide a pasty product. Generally, the water will contain at least about 10 p.p.m. of calcium. Calcium gluconate advantageously can be added to the water in amounts of from about 100 to about 500 p.p.m. and preferably about 200 p.p.m. to provide from about 17 to about 85 and preferably about 35 p.p.m. of calcium. It will be apparent that other water-soluble nontoxic calcium salts also may be employed to provide a comparable amount of calcium. These salts may be of the inorganic variety such as calcium chloride and the like, or may be of the organic variety such as calcium citrate and the like. Since calcium citrate exhibits a sequestering action for iron, this material may constitute a preferred additive. While innocuous minerals other than iron may be present in the water, they do not appear to provide any particular advantage.

Similar amounts of calcium ions may be present in the water employed for the cooling step and the water added to the mash before dehydration. The presence of calcium ions in the water employed for these process steps may improve the texture of the final product, but the presence of calcium ions is not essential and excellent results may be achieved using calcium-free water.

The undesirable iron may be removed from the water employed in this invention by any of the means known to the art. Iron removal effectively may be accomplished, for example, by demineralizing the water utilizing zeolite or the like. The removal of other ions (except for calcium) in such treatment does not adversely affect the utility of the water. Conversely, the presence of ions such as sodium or the like is not objectionable. Consequently, terms such as "water containing calcium ions as the sole essential mineral ingredient" and "water essentially free of minerals other than calcium" denotes water which is substantially free of iron as the objectionable mineral.

It is also necessary that the potatoes be processed while avoiding iron contamination from the process equipment. Iron or standard steel equipment can contaminate the potatoes particularly during cooking, drying, and crumbling; and, therefore, stainless steel or similar equipment should be employed for the process of this invention.

In order to prevent the dehydrated potato product from darkening during storage, it is advisable to incorporate sulfite into the product. An inorganic sulfite, such as sodium bisulfite, sodium sulfite or like materials may be employed to provide from about 200 to about 300 p.p.m. of sulfite in the dried product (as $SO_2$).

While the sulfite may be added to the potato mash before final dehydration, it has been found that the addition of at least some of the sulfite in the precooking step effects an improvement in flavor and color in the final product. Since the temperatures encountered in the precooking step are not sufficiently high to prevent enzyme action, such action may tend to occur throughout the process. Although the process of this invention may be practiced without the addition of sulfite to the precooking step and a product will be obtained which does not exhibit any visual browning, nevertheless, the addition of at least from about 0.05% and preferably about 0.1% sulfite (as $SO_2$) to the water employed in the precooking step effects an improvement in the flavor of the final product. The total sulfite content for the finished product may be supplied to the precooking step or to the potato mash. Alternatively, the sulfite may be added at each step.

It has also been discovered that the texture of the potato crumb material of this invention can be improved by a final heat treatment. This is especially true if the material is to be used for the baked potato product. The potato crumb product is subject to a temperature of from about 170° F. to about 200° F. for a time period of from about 1/2 to about 3 hours and preferably to a temperature of about 180° F. for about 2 1/2 hours. The heat treatment can be accomplished either under vacuum conditions or at atmospheric pressure as, for example, by circulating hot air through the potato crumb product. The heat treatment is apparently effective to produce a retrograding action on the starch, whereby the starch tends to lose its ability to swell in water during rehydration. While the heat may effect a very slight browning action, this does not adversely affect the product particularly when the sulfite additive is present. Crumb products subjected to a final heat treatment exhibit a definite improvement in texture over those not so treated.

As indicated earlier, the dehydrated potato crumb product of this invention may be mechanically admixed with water, milk, or a mixture of milk and water to provide a mashed potato product. The liquid may be heated prior to its addition to the dehydrated potato or the ingredients may be mixed cold and subsequently heated to provide the desired mashed potato.

Additionally, the dehydrated potato crumb product of this invention may be employed to provide an "instant baked potato." In order to achieve the texture of a baked potato, cold milk or its equivalent (i.e., one portion of water and one portion of half-and-half cream) may be added to the crumb material without stirring, and the product baked for about 10 minutes in an oven preheated to 450° F. The product so produced is characterized by both the texture and the flavor of a baked potato. Generally about 5 cc. of liquid is added to each gram of the dried potato crumb material. It will be apparent that seasoning such as salt, pepper, monosodium glutamate, garlic, cheese, and the like also may be added to the mixture.

The instant baked potato most appropriately may be obtained by packaging any desired amount of the dehydrated potato crumb product of this invention in a pouch of aluminum foil or like material. Prior to serving, the liquid may be added to the pouch, the top folded close to form a package, and the entire package baked. Such procedure does not require any mechanical stirring of ingredients and provides an excellent skinless baked potato.

The dehydrated potato crumb product of this invention also may be employed to provide a dehydrated potato soup mix. The potato crumb product may be admixed with about twice its weight of dehydrated whole milk powder and appropriate dry seasoning. The mix then may be packaged and later conconstituted with cold water and heated to provide a hot potato soup.

The following examples are included to more fully demonstrate the practice of this invention. These examples are included for illustrative purposes only and in no way limit the scope of the invention.

In the following examples, the organoleptic scores employed to rate the products range from 1 to 9. Scores of from 6 through 9 are in the highly acceptable range, while scores from 1 to 4 characterize unacceptable qualities with 5 being the lowest acceptable score. More particularly defined, the organoleptic numerical scores correlate to quality as follows:

9. Excellent
8. Very good
7. Good
6. Fair
5. Acceptable
4. Slightly unacceptable
3. Undesirable
2. Unpleasant
1. Repulsive

EXAMPLE I

Idaho russet potatoes were washed, peeled, trimmed, subjected to a second washing and finally were sliced in ⅝ inch slabs. The potatoes were subjected to a precooking for about 30 minutes at 165° F. The amount of water employed was about equal to the weight of the potatoes. Following the precooking, the potatoes were cooled at 45° F. with cold water. The potatoes were maintained at 45° F. for about one hour and then were subjected to steam cooking at 210° F. for about 16 minutes. The potatoes, while hot, were mashed and dried on a double drum dryer to a moisture content of slightly less than 5%. Finally, the precooked potato flakes were crumbled through a standard ⅛ inch wire screen.

The above process was conducted utilizing stainless steel equipment and demineralized water containing an added 200 p.p.m. of calcium gluconate.

When reconstituted with boiling water or with a mixture of water and milk, the potato crumb product was characterized by good texture, flavor, and color. Results of organoleptic tests are reflected in Table 1 below.

*Table 1*

| Test | Organoleptic Values, Rehydration | | | | | |
|---|---|---|---|---|---|---|
| | Water | | | Milk + Water | | |
| | T | F | C | T | F | C |
| A | 7 | 9 | 8 | 6 | 8 | 8 |

In the above table and those which follow, capital T represents Texture, capital F represents Flavor, and capital C represents Color. With respect to rehydration, water signifies boiling water and "Milk+Water" signifies one part milk and three parts boiling water.

EXAMPLE II

Potato crumbs produced by the process of Example I were subjected to a heat treatment at 180° F. for 2½ hours.

Table 2 sets forth the organoleptic scores for the heat-treated samples.

*Table 2*

| Test | Organoleptic Values, Rehydration | | | | | |
|---|---|---|---|---|---|---|
| | Water | | | Milk + Water | | |
| | T | F | C | T | F | C |
| B | 8 | 8 | 8 | 5 | 9 | 8 |

EXAMPLE III

In order to compare the products of Examples I and II with products produced employing tap water, the examples were repeated with portions of the same batch of potatoes utilizing tap water. Test C included no heat treatment, whereas Test D utilized the heat treatment of Example II.

*Table 3*

| Test | Organoleptic Values, Rehydration | | | | | |
|---|---|---|---|---|---|---|
| | Water | | | Milk + Water | | |
| | T | F | C | T | F | C |
| C | 7 | 7 | 8 | 6 | 7 | 8 |
| D (heat treated) | 8 | 6 | 8 | 5 | 7 | 8 |

Comparison of tests C and D with tests A and B demonstrates that the utilization of demineralized water containing added calcium ions substantially improved the flavor of the product.

EXAMPLE IV

The process of Examples I and II was repeated utilizing demineralized water containing no added calcium ions. Test E was performed according to Example I and test F was performed according to Example II.

*Table 4*

| Test | Organoleptic Values, Rehydration | | | | | |
|---|---|---|---|---|---|---|
| | Water | | | Milk + Water | | |
| | T | F | C | T | F | C |
| E | 5 | 6 | 8 | 8 | 9 | 8 |
| F | 7 | 8 | 8 | 9 | 9 | 8 |

In addition to its poor flavor when reconstituted with water, the product was difficult to dry. It was sticky and did not flake off the rolls readily.

EXAMPLE V

A batch of potatoes was divided into two portions and processed according to Example I. The indicated amount of sodium bisulfite was added to the mash before the mash was dried.

*Table 5*

| Test | 1.3% sodium bisulfite solution added, cc./lb. of mash | Organoleptic Values, Rehydration | | | | | |
|---|---|---|---|---|---|---|---|
| | | Water | | | Milk+Water | | |
| | | T | F | C | T | F | C |
| G | 10 | 9 | 7 | 8 | 7 | 8 | 9 |
| H | 5 | 9 | 8 | 8 | 7 | 9 | 9 |

EXAMPLE VI

A batch of potatoes was divided into two portions and processed according to Example II. The indicated amount of sodium bisulfite was added to the mash before the mash was dried.

Table 6

| Test | 1.3% sodium bisulfite solution added, cc./lb. of mash | Organoleptic Values, Rehydration |||||| 
|---|---|---|---|---|---|---|---|
| | | Water ||| Milk+Water |||
| | | T | F | C | T | F | C |
| I | 10 | 9 | 7 | 8 | 6 | 8 | 9 |
| J | 5 | 9 | 6 | 8 | 6 | 8 | 9 |

EXAMPLE VII

Small aluminum pouches of about 1½ inches by 3½ inches by 2 inches high were formed and about 14 grams of each of the dried crumb products of Example II were added to a pouch. The potato crumb product further was seasoned with about 0.5 gram of salt and about 0.1 gram of monosodium glutamate. Seventy cc. of cold milk was added to each of the pouches without stirring, the top of the pouch was folded to close the package and the package was placed in an oven preheated to 450° F. for 10 minutes. The product was hot and it exhibited the texture, flavor, and color of a baked potato.

EXAMPLE VIII

The procedure of Example VII was repeated, except that 35 cc. of cold water and 35 cc. of half-and-half cream was employed. Again, the hot product was characterized by the texture, flavor, and color of a baked potato.

EXAMPLE IX

A potato soup mix was prepared employing the following formulation:

| | Gm. |
|---|---|
| Dehydrated potato crumbs | 21 |
| Dehydrated whole milk powder | 40 |
| Monosodium glutamate | 5 |
| Salt | 2½ |
| Pepper | ½ |
| Onion powder | 5 |

One and one-half cups of cold water were added to a saucepan and the above formulation was sprinkled on the surface while whipping with a fork. The contents were heated to simmering with occasional stirring and were held for 1 to 2 minutes. A potato soup resulted which was characterized by an excellent flavor and texture.

Since modifications of the present invention will be apparent to those skilled in the art, it is intended that this invention be limited only by the scope of the appended claims.

We claim:
1. A process for producing dehydrated cooked potatoes which may be reconstituted to provide either a mashed or a baked potato which comprises:
   (1) precooking potato slabs at a temperature of about 145° F. to about 170° F. for a time period of from about 15 to about 45 minutes in water containing calcium ions as the sole essential mineral ingredient;
   (2) cooling the precooked potato slabs to a temperature below about 60° F. with cold water essentially free of minerals other than calcium and maintaining the potato slabs at a temperature below about 60° F. for at least about 10 minutes;
   (3) cooking the cooled precooked potato slabs with steam for a time period of from about 10 to about 20 minutes;
   (4) mashing the hot cooked potatoes;
   (5) rapidly drying the mashed potatoes as a thin film on a heated surface to a moisture content of not more than about 5%; and
   (6) crumbling the dried potato to provide a potato crumb not greater than about ⅛ inch in cross-section, said process being carried out in the substantial absence of iron contamination.

2. The process of claim 1 wherein the water for precooking contains from about 100 to about 500 p.p.m. of calcium gluconate.

3. The process of claim 1 wherein the water employed for the precook contains at least about 0.05% sulfite.

4. The process of claim 1 wherein sufficient inorganic sulfite is added to provide a sulfite content in the dried product of from about 200 to about 300 p.p.m. calculated on an $SO_2$ basis.

5. The process of claim 1 wherein the potato crumb is subjected to a heat treatment at a temperature from about 170° F. to about 200° F. for a time period of from about ½ to about 3 hours.

6. A process for producing dehydrated cooked potatoes which may be reconstituted to provide either a mashed or a baked potato which comprises:
   (1) precooking potato slabs at a temperature of about 160° F. to about 170° F. for a time period of from about 25 to about 35 minutes in water containing calcium ions as the sole essential mineral ingredient;
   (2) cooling the precooked potato slabs to a temperature below about 60° F. with cold water essentially free of minerals other than calcium and maintaining the potato slabs at a temperature below about 60° F. from about 20 to about 60 minutes;
   (3) cooking the cooled precooked potato slabs with steam for a time period of about 16 minutes;
   (4) mashing the hot cooked potatoes;
   (5) rapidly drying the mashed potatoes as a thin film on a heated surface to a moisture content of not more than 5%; and
   (6) crumbling the dried potato to provide a potato crumb not greater than about ⅛ inch in cross-section, said process being carried out in the substantial absence of iron contamination.

7. The process of claim 6 wherein the water for precooking contains about 200 p.p.m. of calcium gluconate.

8. The process of claim 6 wherein the water employed for the precook contains at least about 0.1% sulfite.

9. The process of claim 6 wherein sufficient inorganic sulfite is added to provide a sulfite content in the dried product of from about 200 to about 300 p.p.m. calculated on a $SO_2$ basis.

10. The process of claim 6 wherein the potato crumb is subjected to heat treatment at a temperature of about 180° F. for about 2½ hours.

References Cited in the file of this patent

Cording I, Potato Flakes, a new form of dehydrated mashed potatoes, ARS 73–25, July 1959, U.S. Dept. of Agriculture, pp. 6–9, 15–21.

Cording II, Potato Flakes, a new form of dehydrated mashed potatoes, ARS 73–2, November 15, 1954, U.S. Dept. of Agriculture, pp. 2 and 3.

Cox: Laboratory Control of Water Purification, published by Case-Shepperd-Mann, 1946, pp. 79 and 313.